(12) United States Patent
Lucey

(10) Patent No.: US 11,918,897 B2
(45) Date of Patent: Mar. 5, 2024

(54) SYSTEM AND METHOD FOR INDIVIDUAL PLAYER AND TEAM SIMULATION

(71) Applicant: STATS LLC, Chicago, IL (US)

(72) Inventor: Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 10 days.

(21) Appl. No.: 17/660,980

(22) Filed: Apr. 27, 2022

(65) Prior Publication Data
US 2022/0339538 A1    Oct. 27, 2022

Related U.S. Application Data

(60) Provisional application No. 63/180,168, filed on Apr. 27, 2021.

(51) Int. Cl.
*A63F 13/497* (2014.01)
*A63F 13/573* (2014.01)
*A63F 13/86* (2014.01)

(52) U.S. Cl.
CPC ......... *A63F 13/497* (2014.09); *A63F 13/573* (2014.09); *A63F 13/86* (2014.09); *A63F 2300/5533* (2013.01); *A63F 2300/646* (2013.01)

(58) Field of Classification Search
CPC ...... A63F 13/497; A63F 13/86; A63F 13/573; A63F 2300/5533; A63F 2300/646
See application file for complete search history.

(56) References Cited

U.S. PATENT DOCUMENTS 6,292,706 B1 * 9/2001 Birch ............... A63F 13/30
463/2
6,616,529 B1 9/2003 Qian et al.
(Continued)

FOREIGN PATENT DOCUMENTS

CN    1386241    12/2002
CN   105833502    8/2016
(Continued)

OTHER PUBLICATIONS

Power, et al., "Not all passes are created equal: Objectively measuring the risk and reward of passes in soccer from tracking data", KDD 2017 Applied Data Science Paper, Aug. 2017, pp. 1605-1613.
(Continued)

*Primary Examiner* — Reginald A Renwick
(74) *Attorney, Agent, or Firm* — Bookoff McAndrews, PLLC

(57) ABSTRACT

A computing system retrieves historical event data for a plurality of games in a league. The historical event data includes (x,y) coordinates of players within each game and game context data. The computing system learns one or more attributes of each team in each game and each player on each team in each game. The computing system receives a request to simulate a play in a historical game. The request includes substituting a player that was in the play with a target player that was not in the play. The computing system simulates the play with the target player in place of the player based on the one or more attributes learned by the computing system. The computing system generates a graphical representation of the simulation.

20 Claims, 5 Drawing Sheets

(56) References Cited

U.S. PATENT DOCUMENTS

| | | | |
|---|---|---|---|
| 6,710,713 | B1 | 3/2004 | Russo |
| 9,342,785 | B2 | 5/2016 | Lucey et al. |
| 9,442,933 | B2 | 9/2016 | Tzoukermann et al. |
| 9,775,396 | B1* | 10/2017 | Olivares Velasco ..... H04Q 9/00 |
| 10,201,752 | B2 | 2/2019 | Lucey et al. |
| 11,157,742 | B2 | 10/2021 | Zhang et al. |
| 2002/0165697 | A1 | 11/2002 | Min |
| 2004/0148278 | A1 | 7/2004 | Milo et al. |
| 2005/0143198 | A1 | 6/2005 | Charge |
| 2006/0149674 | A1 | 7/2006 | Cook et al. |
| 2006/0246972 | A1* | 11/2006 | Thomas ................... A63F 13/00 463/4 |
| 2006/0247808 | A1* | 11/2006 | Robb ................ G09B 19/0038 700/91 |
| 2006/0252476 | A1 | 11/2006 | Bahou |
| 2007/0265043 | A1* | 11/2007 | Wang ..................... A63F 13/34 463/2 |
| 2007/0293289 | A1 | 12/2007 | Loeb |
| 2008/0281444 | A1* | 11/2008 | Krieger ................. A63F 13/828 700/91 |
| 2009/0186679 | A1 | 7/2009 | Irvine et al. |
| 2009/0203447 | A2 | 8/2009 | Hansen et al. |
| 2010/0184495 | A1 | 7/2010 | Levy et al. |
| 2010/0184563 | A1 | 7/2010 | Molyneux et al. |
| 2010/0283630 | A1 | 11/2010 | Alonso |
| 2011/0013087 | A1 | 1/2011 | House et al. |
| 2011/0013836 | A1* | 1/2011 | Gefen ..................... G06T 7/248 382/171 |
| 2011/0169959 | A1 | 7/2011 | DeAngelis et al. |
| 2011/0173235 | A1 | 7/2011 | Aman et al. |
| 2011/0267461 | A1 | 11/2011 | Birenboim et al. |
| 2012/0046093 | A1* | 2/2012 | Yamaguchi ........... A63F 13/216 463/43 |
| 2012/0162435 | A1 | 6/2012 | Elangovan et al. |
| 2012/0233105 | A1 | 9/2012 | Cavallaro et al. |
| 2012/0295677 | A1 | 11/2012 | Ok |
| 2013/0104870 | A1 | 5/2013 | Rizzo et al. |
| 2013/0110271 | A1 | 5/2013 | Fornell et al. |
| 2013/0225271 | A1 | 8/2013 | Amaitis |
| 2013/0267328 | A1 | 10/2013 | Heisler et al. |
| 2014/0142921 | A1 | 5/2014 | Gleadall et al. |
| 2014/0143183 | A1 | 5/2014 | Sigal et al. |
| 2014/0236331 | A1 | 8/2014 | Lehmann et al. |
| 2014/0248953 | A1 | 9/2014 | Kelly et al. |
| 2014/0274245 | A1 | 9/2014 | Stickel |
| 2014/0302914 | A1 | 10/2014 | Weinstein et al. |
| 2014/0309000 | A1 | 10/2014 | Gustafson |
| 2014/0364976 | A1 | 12/2014 | Wohl et al. |
| 2015/0131845 | A1 | 5/2015 | Forouhar et al. |
| 2015/0142716 | A1 | 5/2015 | Lucey et al. |
| 2015/0148129 | A1 | 5/2015 | Austerlade et al. |
| 2015/0273345 | A1* | 10/2015 | Ford ..................... A63F 13/828 463/31 |
| 2016/0182415 | A1 | 6/2016 | Ames et al. |
| 2016/0203279 | A1 | 7/2016 | Srinivas et al. |
| 2016/0220878 | A1 | 8/2016 | Devathi |
| 2016/0260015 | A1 | 9/2016 | Lucey et al. |
| 2016/0375365 | A1 | 12/2016 | Thompson et al. |
| 2017/0043260 | A1 | 2/2017 | Austerlade et al. |
| 2017/0061314 | A1 | 3/2017 | Schnurr et al. |
| 2017/0072321 | A1 | 3/2017 | Thompson et al. |
| 2017/0080336 | A1 | 3/2017 | Groset |
| 2017/0109015 | A1 | 4/2017 | Krasadakis |
| 2017/0165570 | A1 | 6/2017 | Lucey et al. |
| 2017/0177930 | A1* | 6/2017 | Holohan ................ G06T 7/251 |
| 2017/0235848 | A1 | 8/2017 | Van Dusen et al. |
| 2017/0238055 | A1 | 8/2017 | Chang et al. |
| 2017/0246539 | A1 | 8/2017 | Schwartz et al. |
| 2017/0255830 | A1 | 9/2017 | Chen |
| 2017/0257653 | A1 | 9/2017 | Farre et al. |
| 2017/0291093 | A1 | 10/2017 | Janssen |
| 2017/0330029 | A1 | 11/2017 | Turcot et al. |
| 2018/0032858 | A1 | 2/2018 | Lucey et al. |
| 2018/0054659 | A1* | 2/2018 | Goswami ............. H04N 13/243 |
| 2018/0084310 | A1 | 3/2018 | Katz et al. |
| 2018/0137364 | A1 | 5/2018 | Forouhar et al. |
| 2018/0218243 | A1 | 8/2018 | Felsen et al. |
| 2019/0087661 | A1 | 3/2019 | Lee et al. |
| 2019/0228306 | A1 | 7/2019 | Power et al. |
| 2019/0228316 | A1 | 7/2019 | Felsen et al. |
| 2019/0251366 | A1 | 8/2019 | Zhong et al. |
| 2020/0170549 | A1 | 6/2020 | Baykaner et al. |
| 2020/0218902 | A1 | 7/2020 | Chang et al. |
| 2020/0276474 | A1 | 9/2020 | Power et al. |
| 2020/0353311 | A1 | 11/2020 | Ganguly et al. |
| 2021/0241145 | A1 | 8/2021 | Power et al. |
| 2022/0108111 | A1 | 4/2022 | Patton et al. |
| 2022/0339538 | A1* | 10/2022 | Lucey .................... A63F 13/56 |

FOREIGN PATENT DOCUMENTS

| | | |
|---|---|---|
| KR | 10-0986647 | 10/2010 |
| WO | 2014/008134 | 1/2014 |
| WO | 2015/076682 | 5/2015 |
| WO | 2017/031356 | 2/2017 |
| WO | 2017/161167 | 9/2017 |

OTHER PUBLICATIONS

Cervone, et al., "A multiresolution stochastic process model for predicting basketball possession outcomes", Journal of the American Statistical Association 111.514, 2016, pp. 585-599.

Ruiz, et al., "The Leicester City Fairytale?" Utilizing New Soccer Analytics Tools to Compare Performance in the 15/16 & 16/17 EPL Seasons, KDD, Aug. 2017, 13 pages.

Gyarmati, et al., "Searching for a unique style in soccer", KDD Workshop on Large-Scale Sports Analytics, 2014, 4 pages.

PCT International Application No. PCT/US22/26534, International Search Report and Written Opinion of the International Searching Authority, dated Aug. 2, 2022, 8 pages.

ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.

Pulling, "Long Corner Kicks in The English Premier League: Deliveries Into The Goal Ara and Critical Area", Kinesiology: International journal of fundamental and applied kinesiology 47.2, 2015, pp. 193-201.

Casal, et al., "Analysis of Corner Kick Success in Elite Football", International Journal of Performance Analysis in Sport 2015, pp. 430-451.

Bialkowski, et al., "Large-Scale Analysis of Soccer Matches using Spatiotemporal Tracking Data", IEEE International Conference on Data Mining, 2014, 6 pages.

Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.

Le, et al., "Data-Driven Ghosting using Deep Imitation Learning", MIT Sloan Sports Analytics Conference, Mar. 3-4, 2017, 15 pages.

Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.

Ross, et al., "Shortcomings in the attribution process: On the origins and maintenance of erroneous social assessments", Cambridge University Press, 1982, pp. 129-152.

Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.

Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.

Frey, et al., "Clustering by Passing Messages Between Data Points" Science Magazine, Feb. 15, 2007, 23 pages.

(56) References Cited

OTHER PUBLICATIONS

Anderson, et al., "The Numbers Game: Why Everything You Know About Soccer is Wrong", 2013, Penguin Books.
Al-Shboul, et al., "Automated Player Selection for Sports Team using Competitive Neural Networks", International Journal of Advanced Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Yue, et al., "Learning Fine-Grained Spatial Models for Dynamic Sports Play Prediction", ICDM, 2014, 10 pages.
International Search Report and Written Opinion for PCT Application No. PCT/US2016/066733, dated Apr. 17, 2017, 11 pages.
Bialkowski, et al., "Large-Scale Analysis of Soccer Matches using Spatiotemporal Tracking Data", ICDM, 2014, 6 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Wei, et al., "Predicting Serves in Tennis using Style Priors", KDD, 2015, 9 pages.
Miller, et al., "Factorized Point Process Intensities: A Spatial Analysis of Professional Basketball", ICML, Jan. 8, 2014, 13 pages.
Peng, et al., "RASL: Robust Alignment by Sparse and Low-rank Decomposition for Linearly Correlated Images", PAMI, vol. 34, No. 11, 2012, 8 pages.
Sha, et al., "Chalkboarding: A New Spatiotemporal Query Paradigm for Sports Play Retrieval".
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.
Akhter, et al., "Bilinear Spatiotemporal Basis Models", ACM Transactions on Graphics, vol. 30, No. 2, Article 17, Apr. 2012, 12 pages.
Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning-vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters for Multi-target Tracking", International journal of computer vision 122.3 , 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.
Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques for Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingma, et al., "Auto-Encoding Variational Bayes", arXiv preprint arXiv:1312.6114, May 1, 2014, 14 pages.
Gregor, et al., "DRAW: A Recurrent Neural Network for Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
Van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.
Walker, et al., "An Uncertain Future: Forecasting from Static Images using Variational Autoencoders", European Conference on Computer Vision, 2016, 17 pages.
Srinivas, et al., "A taxonomy of deep convolutional neural nets for computer vision", Frontiers in Robotics and AI 2, Jan. 11, 2016, 13 pages.
Dertat, "Applied deep learning-part 4: Convolutional neural networks", Towards Data Science, https://towardsdatascience.com/applied-deep-learning-part-4-convolutional-neural-networks-584bc134c1e2, Nov. 8, 2017, 26 pages.
Edge AI and Vision Alliance, "Using Convolutional Neural Networks for Image Recognition", https://www.edge-ai-vision.com/2015/11/using-convolutional-neural-networks-for-image-recognition/, Nov. 12, 2015, 20 pages.
Machine Learning Notebook, "Convolutional Neural Networks—Basics", https://mlnotebook.github.io/post/CNN1/, Apr. 7, 2017, 13 pages.
Knauf, et al., "Spatio-temporal convolution kernels", Machine learning 102.2, Jul. 2015, 28 pages.
Blaikie, et al. "NFL & NCAA Football Prediction using Artificial Neural network", Proceedings of the Midstates Conference for Undergraduate Research in Computer Science and Mathematics, 2011, 8 pages.
Chandler, et al., "An exploratory study of minor league baseball statistics," Journal of Quantitative Analysis in Sports 8.4, 2012.
Zhao, et al., "Applying deep bidirectional LSTM and mixture density network for basketball trajectory prediction," Optik 158, Aug. 2017, pp. 266-272.
Perricone, et al., "Predicting Results for Professional Basketball Using NBA API Data," 2016, 6 pages.

(56) References Cited

OTHER PUBLICATIONS

Kinoshita, et al., "Deep mixture density network for statistical model-based feature enhancement," 2017 IEEE International Conference on Acoustics, Speech and Signal Processing (ICASSP), Mar. 2017, pp. 251-255.
Wang, et al., "Classifying NBA Offensive Plays Using Neural Networks," MIT Sloan Sports Analytics Conference, 2016, 9 pages.
Zhao, "Research and Application of Online Learning of Formation Strategy Based on Neural Network, Information Technology Collection of China Masters' Dissertations Full Text Database," No. 2, 2014, pp. 38-40.
Wei., "Modelling and predicting adversarial behaviour using large amounts of spatiotemporal data," Diss. Queensland University of Technology, 2016, 167 pages.
Liang, et al., "Dual motion gan for future-flow embedded video prediction," proceedings of the IEEE international conference on computer vision, 2017, 9 pages.
Mehrotra, et al., "Elements of Artificial Neural Networks," MIT, 1997, 351 pages.
Arabzad, et al., "Football Match Results Prediction using Artificial Neural Networks; The case of Iran Pro League," Journal of Applied Research on Industrial Engineering, vol. 1, No. 3, Oct. 9, 2014, pp. 159-179.
International Search Report and Written Opinion for PCT Application No. PCT/US2019/014614, dated Apr. 16, 2019, 8 pages.
International Search Report and Written Opinion for PCT Application No. PCT/US2019/014608, dated Apr. 15, 2019, 11 pages.
Acuna, "Unsupervised modeling of the movement of basketball players using a deep generative model," http://www.cs.toronto.edu/~davidj/projects/unsupervised model ing using a DGM. pdf, 31st Conference on Neural Information Processing Systems, 2017, 11 pages.
Felsen, et al., "Where will they go? predicting fine-grained adversarial multi-agent motion using conditional variational autoencoders," Springer Nature Switzerland AG, Proceedings of the European conference on computer vision (ECCV), 2018, pp. 761-776.
Maher, "Modelling Association Football Scores", Statistica Neerlandica 36, nr.3, Published 1982, pp. 109-118.
Dixon, et al., "Modelling Association Football Scores and Inefficiencies in the Football Betting Market", Appl Statist 46. No 2, Published 1997, pp. 265-280.
Koopman, et al., "A dynamic bivariate Poisson model for analysing and forecasting match results in the English Premier League", Dated Sep. 24, 2012, 30 pages.
Boshnakov, et al., "A Bivariate Weibull Count Model for Forecasting Association Football Scores", Dated Sep. 9, 2016, 13 pages.
Boice, "How Our Club Soccer Projections Work", Five ThirtyEight, https://fivethirtyeight.com/features/how-our-club-soccer-projections-work/, Dated Jan. 19, 2017, 6 pages.
Goddard, et al., "Modelling football match results and the efficiency of fixed-odds betting", Published 2004, 27 pages.
Huang, et al., "A Neural Network Method for Prediction of 2006 World Cup Football game", Published 2010 IEEE, 8 pages.
Kharrat, et al., "Plus-Minus Player Ratings for Soccer", arXiv:1706.04943v1, Dated Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, Dated May 15, 2017, 4 pages.
Beuoy, "Updated NBA Win Probability Calculator", InPredictable, http://www.inpredictable.com/2015/02/updated-nba-win-probability-calculator.html, Dated Feb. 6, 2015, 4 pages.
Asif, et al., "In-Play forecasting of win probability in One-Day International cricket: A dynamic logistic regression model", International Journal of Forecasting 32, Published 2016, pp. 34-43.
Pelechrinis, "iWinRNFL: A Simple, Interpretable & Well-Calibrated In-Game Win Probability Model for NFL", arXiv:1704.00197v3, Dated Mar. 14, 2018, 7 pages.
Lock, et al., "Using random forests to estimate win probability before each play of an NFL game", JQAS 2014; 10(2); Published 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Bishop, "Mixture Density Networks", Neural Computing Research Group Report, NCRG/94/004, Dated Feb. 1994, 26 pages.
Kingma, et al., "Adam: A Method for Stochastic Optimization", arXiv:1412.6980v9, ICLR 2015, Dated Jan. 30, 2017, 15 pages.
Paine, "The Pats' Comeback Was Incredible—Even If You Think The Falcons Blew It", Five ThirtyEight, https://fivethirtyeight.com/features/patriots-falcons-comeback-super-bowl/, Dated Feb. 6, 2017, 4 pages.
Deerwester, et al., "Indexing by Latent semantic Analysis", Published 1990, 34 pages.
Blei, et al., "Latent Dirichlet Allocation", Journal of Machine Learning Research 3, Published 2003, pp. 993-1022.
Bengio, et al., "A Neural Probabilistic Language Model", Journal of Machine Learning Research 3, Published 2003, pp. 1137-1155.
Mikolov, et al., "Efficient Estimation of Word Representations in Vector Space", arXiv:1301.3781v3, Dated Sep. 7, 2013, 12 pages.
Mikolov, et al., "Distributed Representations of Words and Phrases and their Compositionality", Published 2013, 9 pages.
Ho, "Random Decision Forests", Published 1995 IEEE, pp. 278-282.
Van den Oord, et al., "WaveNet: A Generative Model for Raw Audio", arXiv:1609.03499v2, Dated Sep. 19, 2016, 15 pages.
Chung, et al., "Hierarchical Multiscale Recurrent Neural Networks", ICLR 2017, arXiv:1609.01704v7, Dated Mar. 9, 2017, 13 pages.
Graves, "Generating Sequences with Recurrent Neural Networks", arXiv:1308.0850v5, Dated Jun. 5, 2014, 43 pages.
PCT International Application No. PCT/US21/16583, International Search Report and Written Opinion of the International Searching Authority, dated Apr. 23, 2021, 12 pages.
Trainor, "Goalkeepers: How repeatable are shot saving performances?", Statsbomb, https://statsbomb.com/2014/10/goalkeepers-how-repeatable-are-shot-saving-performances/ Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.
Cheng, et al., "Wide & deep learning for recommender systems", Proceedings of the 1st workshop on deep learning for recommender systems, Sep. 2016.
Alcorn, "(batterlpitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten, et al., "Visualizing data using t-SNE", Journal of machine learning research 9/08, pp. 2579-2605, Nov. 2008.
Felsen, et al., "Body shots: Analyzing shooting styles in the NBA using body pose", MIT Sloan, Sports Analytics Conference, Mar. 2017.
McCabe, et al., "Artificial Intelligence in Sports Prediction", Fifth International Conference on Information Technology: New Generation, IEEE Computer Society, Apr. 9, 2008, 4 pages.
Abdullah, et al., "Intelligent Prediction of Soccer Technical Skill on Youth Soccer Player's Relative Performance Using Multivariate Analysis and Artificial Neural Network Techniques", International Journal on Advanced Science Engineering Information Technology, vol. 6, No. 5, Dec. 31, 2016, pp. 668-674.

(56) References Cited

OTHER PUBLICATIONS

Preferred Networks, Inc., "Football Analytics using Deep Learning", YouTube, https://www.youtube.com/watch?v=hs_v3dv6OUI, Jul. 25, 2019, 3 pages.
PCT International Application No. PCT/US21/53117, International Search Report and Written Opinion of the International Searching Authority, dated Jan. 14, 2022, 9 pages.
U.S. Appl. No. 17/649,970, "System and Method for Evaluating Defensive Performance using Graph Convolutional Network", filed Feb. 4, 2022.

* cited by examiner

SYSTEM AND METHOD FOR INDIVIDUAL PLAYER AND TEAM SIMULATION

CROSS-REFERENCE TO RELATED APPLICATIONS

This application claims priority to U.S. Provisional Application Ser. No. 63/180,168, filed Apr. 27, 2021, which is hereby incorporated by reference in its entirety.

FIELD OF THE DISCLOSURE

The present disclosure generally relates to system and method for individual player and team simulation using historical tracking data.

BACKGROUND

In professional sports, fans and commentators alike incessantly argue about how players compare players from different generations. One of the more famous debates centers around that of Lebron James and Michael Jordan. Both players have dominated their respective generations and are among the two most mentioned players considered to be the "best of all time." While fans and commentators can debate the issue, there is currently no mechanism to quantify or visualize a matchup between the two players.

SUMMARY

In some embodiments, a method is disclosed herein. A computing system retrieves historical event data for a plurality of games in a league. The historical event data includes (x,y) coordinates of players within each game and game context data. The computing system learns one or more attributes of each team in each game and each player on each team in each game. The computing system receives a request to simulate a play in a historical game. The request includes substituting a player that was in the play with a target player that was not in the play. The computing system simulates the play with the target player in place of the player based on the one or more attributes learned by the computing system. The computing system generates a graphical representation of the simulation.

In some embodiments, a non-transitory computer readable medium is disclosed herein. The non-transitory computer readable medium includes one or more sequences of instructions, which, when executed by a processor, causes a computing system to perform operations. The operations include retrieving, by the computing system, historical event data for a plurality of games in a league. The historical event data include player information within each game and game context data. The operations further include learning, by the computing system, one or more attributes of each team in each game and each player on each team in each game. The operations further include receiving, by the computing system, a request to simulate a play in a historical game. The request includes substituting a player that was in the play with a target player that was not in the play. The operations further include simulating, by the computing system, the play with the target player in place of the player based on the one or more attributes learned by the computing system. The operations further include generating, by the computing system, a graphical representation of the simulation.

In some embodiments, a system is disclosed herein. The system includes a processor and a memory. The memory has programming instructions stored thereon, which, when executed by the processor, causes the system to perform operations. The operations include retrieving historical event data for a plurality of games in a league. The historical event data include player information within each game and game context data. The operations further include learning, by a simulation module, one or more attributes of each team in each game and each player on each team in each game. The operations further include receiving a request to simulate a play in a historical game. The request includes substituting a player that was in the play with a target player that was not in the play. The operations further include simulating, by the simulation module, the play with the target player in place of the player based on the one or more attributes learned by the simulation module. The operations further include generating a graphical representation of the simulation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques provided herein provides a system and method for replaying a play in a given event by changing the players involved in the play and simulating what the alternative outcome would be. For example, one of the more infamous plays in sports' history involves Michael Jordan hitting the game-winning jump shot against the Utah Jazz over Byron Russell in game 6 of the 1998 NBA Finals. Using the one or more techniques provided herein, the present system is able to replace Byron Russel with another player, such as, but not limited to Larry Bird, Wilt Chamberlain, Magic Johnson, Lebron James, or Kawhi Leonard.

To achieve such functionality, the present system may utilize historical tracking data. Such historical tracking data may include the (x, y) coordinates of each player during the course of the game and/or body-pose information of each player during the course of the game. Further, to account for differences in errors, the present system may utilize one or more model adaptation techniques (e.g., transfer learning) to ensure that differences between eras may be normalized to increase the accuracy of the simulation.

While the present discussion is provided in the context of both soccer and basketball, those skilled in the art readily understand that such functionality may be extended to other sports.

Figure 1:
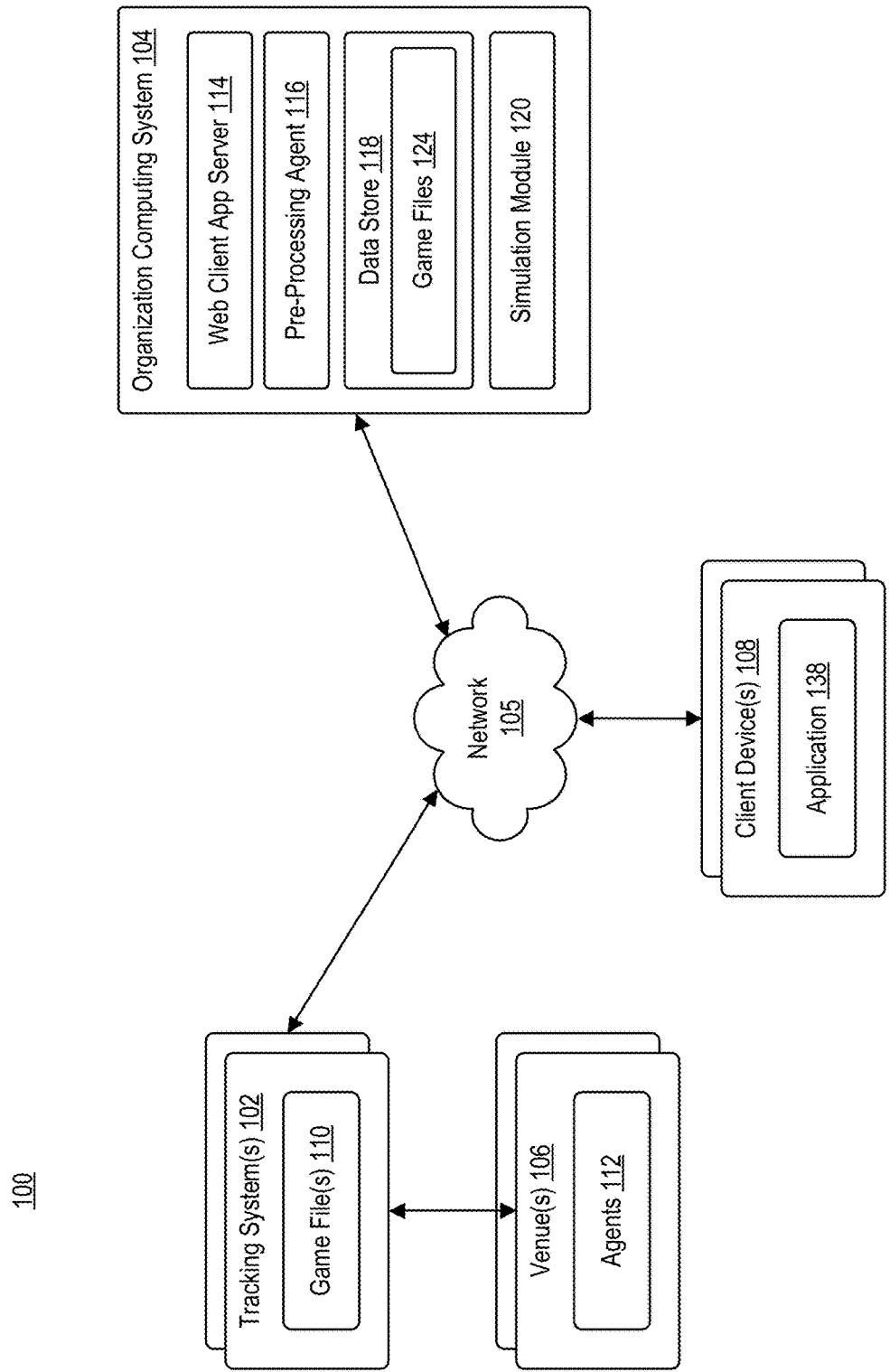
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and a simulation module 120. Each of pre-processing agent 116 and simulation module 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may correspond to each play-by-play event in a particular match. In some embodiments, non-spatial event data may be derived from spatial event data. For example, pre-processing agent 116 may be configured to parse the spatial event data to derive play-by-play information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

In some embodiments, each game file 124 may further include the home and away team box scores. For example, the home and away teams' box scores may include the number of team assists, fouls, rebounds (e.g., offensive, defensive, total), steals, and turnovers at each time, t, during gameplay. In some embodiments, each game file 124 may further include a player box score. For example, the player box score may include the number of player assists, fouls, rebounds, shot attempts, points, free-throw attempts, free-throws made, blocks, turnovers, minutes played, plus/minus metric, game started, and the like. Although the above metrics are discussed with respect to basketball, those skilled in the art readily understand that the specific metrics may change based on sport. For example, in soccer, the home and away teams' box scores may include shot attempts, assists, crosses, shots, and the like.

Pre-processing agent 116 may be configured to process data retrieved from data store 118. For example, pre-processing agent 116 may be configured to generate one or more sets of information that may be used to train simulation module 120.

Simulation module 120 may be configured to simulate play between various players or teams based on historical tracking data of the players and/or teams. To do so, simulation module 120 may analyze historical games associated with a given league. For example, simulation module 120 may utilize data generated by AutoSTATS to analyze historical game information.

Once simulation module 120 generates or learns various data associated with the historical game information (e.g., body pose information, role information, trajectory information, and/or style information), simulation module 120 may be able to simulate behavior a game or a play between teams or players.

In some embodiments, simulation module 120 may be able to simulate a game or play between teams or players even across generations. For example, simulation module 120 may be able to simulate a play between Lebron James and Michael Jordan, despite the fact that the two players have never played an NBA game against each other. To accurately simulate the performance, simulation module 120 may utilize a transfer learning process. In this manner, simulation module 120 may be able to transfer knowledge of a player in a first era to the course of play in a second era. In other words, simulation module 120 may account for differences of play between eras. In this manner, simulation module 120 can adapt players of different eras to predict how they would play in another era.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 138. Application 138 may be representative of a web browser that allows access to a website or a stand-alone application. Client device 108 may access application 138 to access one or more functionalities of organization computing system 104. Client device 108 may communicate over network 105 to request a webpage, for example, from web client application server 114 of organization computing system 104. For example, client device 108 may be configured to execute application 138 to request a simulation from simulation module 120 and/or view a simulation generated by simulation module 120.

Figure 2:
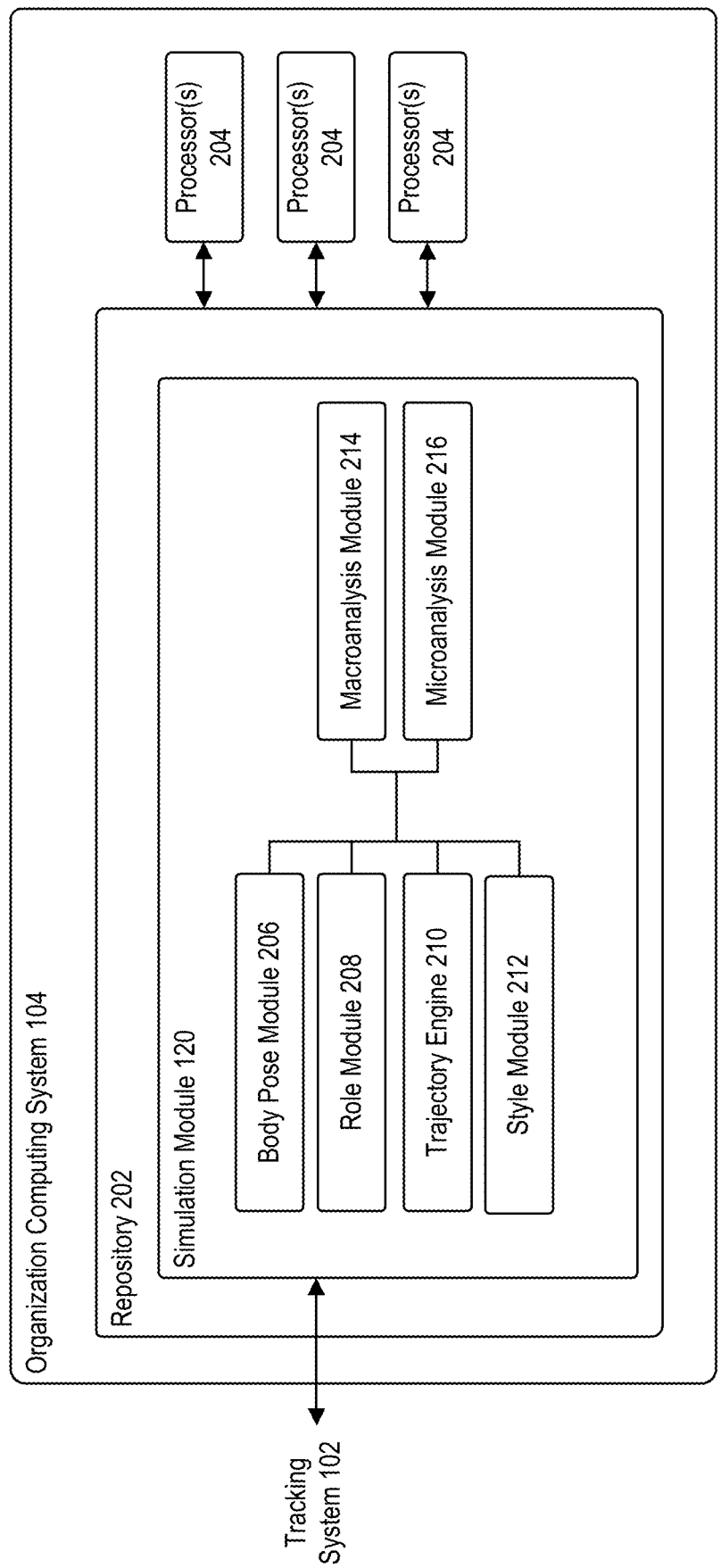
FIG. 2 is a block diagram illustrating the organization computing system of FIG. 1, according to example embodiments

FIG. 2 is a block diagram 200 illustrating organization computing system 104, according to example embodiments. As shown, organization computing system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least simulation module 120.

Simulation module 120 may include at least body pose module 206, role module 208, trajectory engine 210, style module 212, macroanalysis module 214, and microanalysis module 216. Each of body pose module 206, role module 208, trajectory engine 210, style module 212, macroanalysis module 214, and microanalysis module 216 may be comprised of one or more software modules. The one or more software modules are collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As shown, simulation module 120 may be configured to receive tracking data and/or event data from tracking system 102. In some embodiments, the tracking data may be representative of raw (x, y) position information of each player on the playing surface during a course of the game. In some embodiments, event data may indicate various attributes of the game at various points, such as, but not limited to, at one or more points during the game: the players in the game, the players out of the game, the current score, the current time, player statistics at the current time, and the like. In some embodiments, the tracking data may be derived from broadcast video data received from tracking system 102.

Body pose module 206 may be configured to generate one or more metrics related to the body pose of at least one or more of a player throughout a game based on the tracking data and/or event data. In some embodiments, body pose module 206 may generate body pose information based on event data captured by tracking system 102. In some embodiments, body pose module 206 may generate body pose information from a broadcast stream provided by a broadcast provider. Body pose module 206 may be able to identify, for example, shooter start position and angle, run type (e.g., stutter and speed), shot initiation (e.g., body lean angle, upper body angle, hip orientation, kicking arm position, shoulder alignment, etc.), and the like. Additionally, the raw positions of the body-positions in 2D or 3D which appear as a skeleton can be used to detect and correlate specific key actions in sports. Generally, body pose module 206 may be representative of a body pose module disclosed in U.S. application Ser. No. 16/804,964, which is hereby incorporated by reference in its entirety.

Role module 208 may be configured to detect a role in each player of each historical game based on the tracking data and/or event data. For example, role module 208 may be configured to predict various different aspects of team and player functions within a team. For example, role module 208 may utilize an ensemble of models that may work in conjunction to learn the role associated with a given player. In some embodiments, role module 208 may utilize event data to make such determination. Generally, role module 208 may be representative of role prediction platform disclosed in U.S. application Ser. No. 17/167,400, which is hereby incorporated by reference in its entirety.

Trajectory engine 210 may be configured to learn trajectories of each player in each historical game based on the tracking data and/or event data. For example, trajectory engine 210 may be configured to predict the trajectory of one or more agents given one or more historical trajectory points. For example, given an agent's coordinates up to a time $t_q$, trajectory engine 210 may use at least the agent's coordinates up to time $t_q$ to predict the agent's coordinates up to time $t_f$, where $t_f$ is after $t_q$, where q represents some end-time between (e.g., (1 . . . n)) and f represents some future time, after q (e.g., (n+1)). Generally, trajectory engine 210 may be representative of trajectory agent disclosed in U.S. application Ser. No. 16/254,037, which is hereby incorporated by reference in its entirety.

Style module 212 may be configured to learn the various styles and content of each team in each historical game based on the tracking data and/or event data. Content of a given play may be referred to as the "what" of the play, independent of the exact specifics of how a team executes the play. In contrast, style may be referred to as the "how" of the play, which captures the various ways a given play can evolve. Generally, style module 212 may be representative of team prediction agent disclosed in U.S. application Ser. No. 16/870,170, which is hereby incorporated by reference in its entirety.

Macroanalysis module 214 may be configured to perform one or more macro analyses based on one or more of the learned body pose information, the learned role information, the learned trajectory information, or the learned style information. For example, macroanalysis module 214 may be configured to utilize one or more of the learned body pose information, the learned role information, the learned trajectory information, or the learned style information to answer counterfactual questions, such as, determining where Michael Jordan would be drafted in an upcoming NBA draft based on Michael Jordan's collegiate statistics at the University of North Carolina. In such example, macroanalysis module 214 may leverage the prediction model disclosed in U.S. application Ser. No. 17/449,694, which is hereby incorporated by reference in its entirety.

In another example, macroanalysis module 214 may be configured to utilize one or more of the learned body pose information, the learned role information, the learned trajectory information, or the learned style information to answer counterfactual questions, such as, determining the performance of Pele in the English Premier League. In such example, macroanalysis module 214 may leverage the prediction models disclosed in U.S. Provisional Application No. 63/201,898 and U.S. Provisional Application No. 63/267,062, which are both hereby incorporated by reference in their entireties.

Microanalysis module 216 may be configured to perform one or more micro analyses based on one or more of the learned body pose information, the learned role information, the learned trajectory information, or the learned style information. For example, microanalysis module 216 may be configured to simulate a play or a game by replacing a player in the play or game with another player based on one or more of the learned body pose information, the learned role information, the learned trajectory information, or the learned style information. For example, microanalysis module 216 may leverage one or more graph neural networks disclosed in U.S. application Ser. No. 17/649,970, which is hereby incorporated by reference in its entirety, to model defensive behavior of the player.

Figure 3:
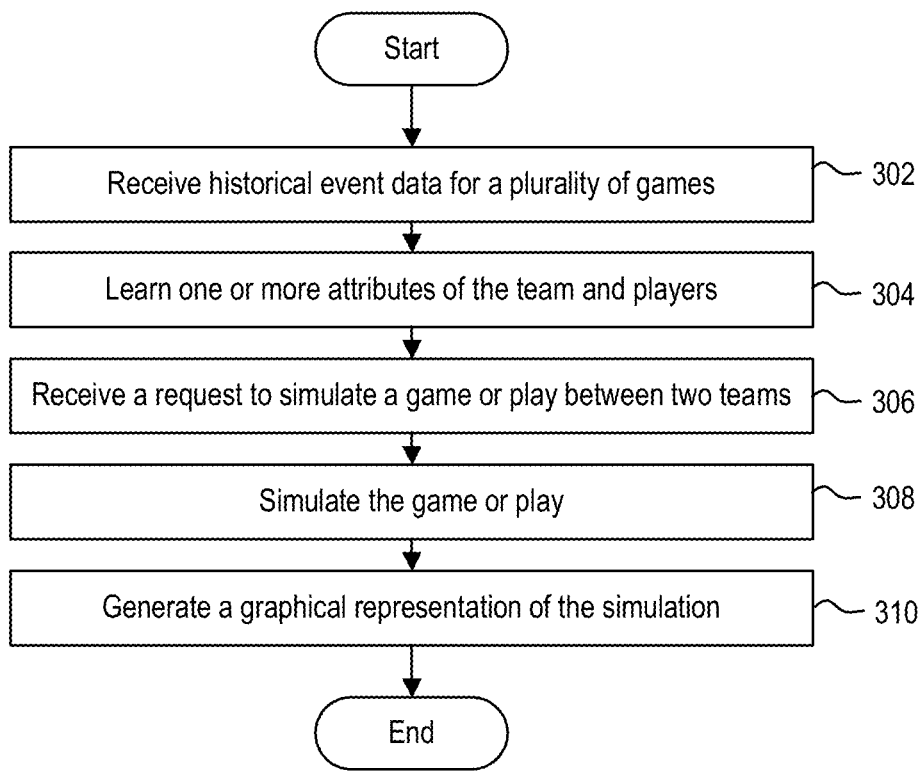
FIG. 3 is a flow diagram illustrating a method of simulating a play, according to example embodiments.

FIG. 3 is a flow diagram illustrating a method 300 of simulating a game or play, according to example embodiments. Method 300 may begin at step 302.

At step 302, organization computing system 104 may retrieve historical event data for a plurality of games in a league. In some embodiments, the historical event data may include the (x, y) coordinates of all players at all points in the game. In some embodiments, the historical event data may include game context data, such as the time of each movement, score at each movement, and the like. Generally, the plurality of games may span several eras. Taking basketball for example, the plurality of games may span the 1960s to current day.

At step 304, organization computing system 104 may learn various attributes of the teams and players in each game. For example, simulation module 120 may learn various attributes of the teams and players in each game, such that simulation module 120 can accurately simulate performance between players and/or teams that may not have ever played each other or did not play each other given the current game context.

At step 306, organization computing system 104 may receive a request to simulate a game or play between two teams. In some embodiments, simulation module 120 may receive the request form client device 108 via application 138 executing thereon. In some embodiments, the request may include replacing one player in a game or player with a different player that is otherwise not involved in the current play of the game. For example, continuing with the above, Lebron James may replace Michael Jordan in the game winning play of Game 6 of the 1998 NBA Finals.

At step 308, organization computing system 104 may simulate the game or play. For example, simulation module 120 may simulate the play between Lebron James and Byron Russell based on learned body pose information, role information, trajectory information, playing style and playing style information. In some embodiments, simulation module 120 may further take into account the difference between eras. For example, simulation module 120 may adapt Lebron James' playing style to the NBA playing style of 1998.

At step 310, organization computing system 104 may generate a graphical representation of the simulation. For example, simulation module 120 may generate a visual corresponding to Lebron James defending Michael Jordan in the game winning play of the 1998 NBA Finals. In some embodiments, simulation module 120 may provide a visual indication of each player's body pose information.

Figure 4:
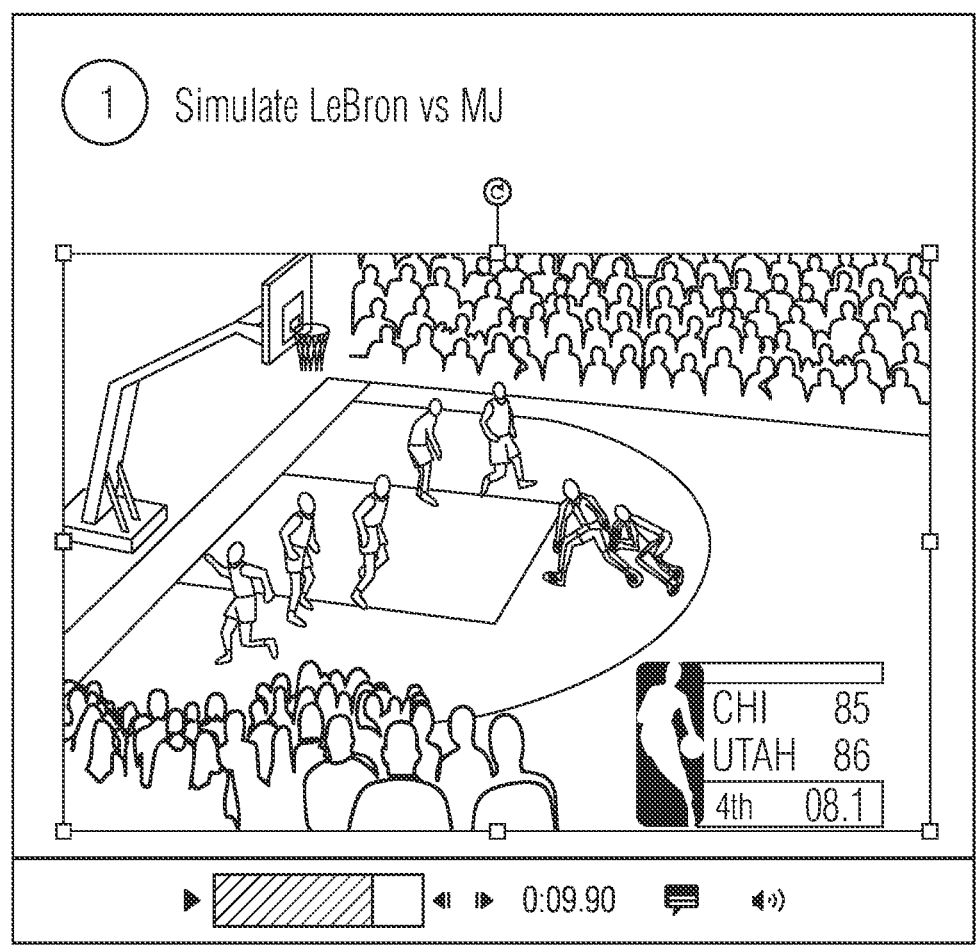
FIG. 4 illustrates an example graphical user interface according to example embodiments.

FIG. 4 illustrates an example graphical user interface (GUI) 400 according to example embodiments. As shown, graphical user interface 400 may correspond to a simulation of Lebron James guarding Michael Jordan in the game winning play of the 1998 NBA Finals. For example, as shown, rather than Byron Russel guarding Michael Jordan in the game winning player, a user has requested that Lebron James be guarding Byron Russel. As shown, GUI 400 may include a skeletal representation of Lebron James guarding a skeletal representation of Michael Jordan. Based on learned information about Lebron James (e.g., one or more of the learned body pose information, the learned role information, the learned trajectory information, or the learned style information), simulation module 120 may simulate the game winning play as if Lebron James was guarding Michael Jordan in that situation rather than Byron Russel.

Although GUI 400 illustrates a scenario in which the defensive player is replaced with another player, those skilled in the art understand that, instead of replacing Bryon Russel, a user may instead replace Michael Jordan with Lebron James. In this manner, based on learned information about Lebron James (e.g., one or more of the learned body pose information, the learned role information, the learned trajectory information, or the learned style information), simulation module 120 may simulate the game winning play as if Lebron James had possession against Byron Russel instead of Michael Jordan.

Figure 5A:
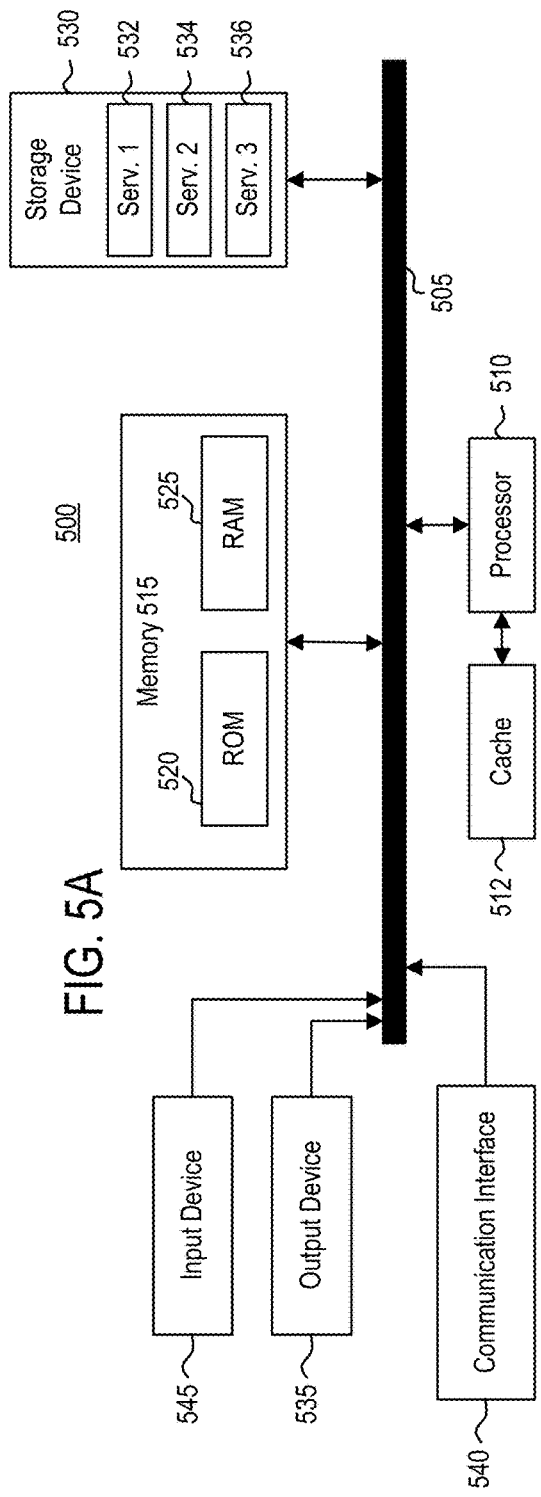
FIG. 5A is a block diagram illustrating a computing device, according to example embodiments.

FIG. 5A illustrates a system bus architecture of computing system 500, according to example embodiments. System 500 may be representative of at least a portion of organization computing system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random access memory (RAM) 525, to processor 510.

System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535 (e.g., display), and so forth, to carry out the function.

Figure 5B:
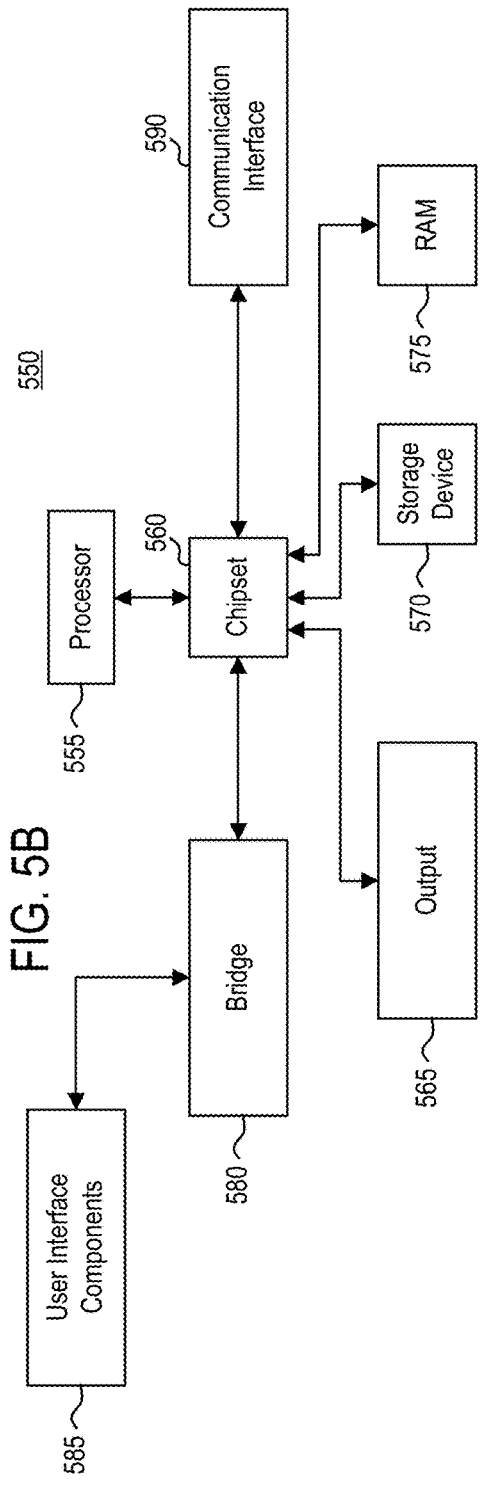
FIG. 5B is a block diagram illustrating a computing device, according to example embodiments.

FIG. 5B illustrates a computer system 550 having a chipset architecture that may represent at least a portion of organization computing system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 outputs information to output 565, such as a display, and may read and write information to storage device 570, which may include magnetic media, and solid state media, for example. Chipset 560 may also read data from and write data to storage device 575 (e.g., RAM). A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or storage device 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
 retrieving, by a computing system, historical event data for a plurality of games in a league, the historical event data comprising player information within each game and game context data;

learning, by the computing system, one or more attributes of each team in each game and each player on each team in each game;

receiving, by the computing system, a request to simulate a play in a historical game, wherein the request comprises substituting a player that was in the play with a target player that was not in the play;

simulating, by the computing system, the play with the target player in place of the player based on the one or more attributes learned by the computing system; and generating, by the computing system, a graphical representation of the simulation.

2. The method of claim 1, wherein generating, by the computing system, the graphical representation of the simulation comprises:

visually simulating the player with the target player in the place of the player.

3. The method of claim 1, wherein retrieving, by a computing system, the historical event data for the plurality of games in the league comprises:

receiving broadcast video data corresponding to the plurality of games; and deriving, from the broadcast video data, player tracking data and the game context data.

4. The method of claim 1, wherein learning, by the computing system, the one or more attributes of each team in each game and each player on each team in each game comprises:

learning trajectories of each player in each game based on the historical event data.

5. The method of claim 4, wherein learning, by the computing system, the one or more attributes of each team in each game and each player on each team in each game comprises:

learning a style of each player and each team based on the historical event data.

6. The method of claim 5, wherein learning, by the computing system, the one or more attributes of each team in each game and each player on each team in each game comprises:

learning a role of each player at one or more points of each game.

7. The method of claim 6, wherein simulating, by the computing system, the play with the target player in place of the player based on the one or more attributes learned by the computing system comprises:

simulating the player based on one or more of learned trajectories of the target player, learned style of the target player, and learned roles of the target player.

8. A non-transitory computer readable medium comprising one or more sequences of instructions, which, when executed by a processor, causes a computing system to perform operations comprising:

retrieving, by the computing system, historical event data for a plurality of games in a league, the historical event data comprising player information within each game and game context data;

learning, by the computing system, one or more attributes of each team in each game and each player on each team in each game;

receiving, by the computing system, a request to simulate a play in a historical game, wherein the request comprises substituting a player that was in the play with a target player that was not in the play;

simulating, by the computing system, the play with the target player in place of the player based on the one or more attributes learned by the computing system; and generating, by the computing system, a graphical representation of the simulation.

9. The non-transitory computer readable medium of claim 8, wherein generating, by the computing system, the graphical representation of the simulation comprises:

visually simulating the player with the target player in the place of the player.

10. The non-transitory computer readable medium of claim 8, wherein retrieving, by a computing system, the historical event data for the plurality of games in the league comprises:

receiving broadcast video data corresponding to the plurality of games; and deriving, from the broadcast video data, player tracking data and the game context data.

11. The non-transitory computer readable medium of claim 8, wherein learning, by the computing system, the one or more attributes of each team in each game and each player on each team in each game comprises:

learning trajectories of each player in each game based on the historical event data.

12. The non-transitory computer readable medium of claim 11, wherein learning, by the computing system, the one or more attributes of each team in each game and each player on each team in each game comprises:

learning a style of each player and each team based on the historical event data.

13. The non-transitory computer readable medium of claim 12, wherein learning, by the computing system, the one or more attributes of each team in each game and each player on each team in each game comprises:

learning a role of each player at one or more points of each game.

14. The non-transitory computer readable medium of claim 13, wherein simulating, by the computing system, the play with the target player in place of the player based on the one or more attributes learned by the computing system comprises:

simulating the player based on one or more of learned trajectories of the target player, learned style of the target player, and learned roles of the target player.

15. A system comprising:

a processor; and a memory having programming instructions stored thereon, which, when executed by the processor, causes the system to perform operations comprising:

retrieving historical event data for a plurality of games in a league, the historical event data comprising player information within each game and game context data;

learning, by a simulation module, one or more attributes of each team in each game and each player on each team in each game;

receiving a request to simulate a play in a historical game, wherein the request comprises substituting a player that was in the play with a target player that was not in the play;

simulating, by the simulation module, the play with the target player in place of the player based on the one or more attributes learned by the simulation module; and generating a graphical representation of the simulation.

16. The system of claim 15, wherein retrieving the historical event data for the plurality of games in the league comprises:

receiving broadcast video data corresponding to the plurality of games; and deriving, from the broadcast video data, player tracking data and the game context data.

17. The system of claim 15, wherein learning, by the simulation module, the one or more attributes of each team in each game and each player on each team in each game comprises:
 learning trajectories of each player in each game based on the historical event data.

18. The system of claim 17, wherein learning, by the simulation module, the one or more attributes of each team in each game and each player on each team in each game comprises:
 learning a style of each player and each team based on the historical event data.

19. The system of claim 18, wherein learning, by the simulation module, the one or more attributes of each team in each game and each player on each team in each game comprises:
 learning a role of each player at one or more points of each game.

20. The system of claim 19, wherein simulating, by the simulation module, the play with the target player in place of the player based on the one or more attributes learned by the simulation module comprises:
 simulating the player based on one or more of learned trajectories of the target player, learned style of the target player, and learned roles of the target player.

* * * * *